United States Patent
Slegers

(10) Patent No.: US 7,364,653 B1
(45) Date of Patent: Apr. 29, 2008

(54) FILTRATION SYSTEMS AND METHODS

(75) Inventor: John Slegers, Breda (NL)

(73) Assignee: Pall Corporation, East Hills, NY (US)

( * ) Notice: Subject to any disclaimer, the term of this patent is extended or adjusted under 35 U.S.C. 154(b) by 0 days.

(21) Appl. No.: 09/787,944

(22) PCT Filed: Aug. 31, 1999

(86) PCT No.: PCT/EP99/06424

§ 371 (c)(1),
(2), (4) Date: May 25, 2001

(87) PCT Pub. No.: WO00/18497

PCT Pub. Date: Apr. 6, 2000

(30) Foreign Application Priority Data

Sep. 25, 1998 (GB) .................................. 9820935.6

(51) Int. Cl.
*A61M 1/16* (2006.01)
*B01D 63/00* (2006.01)
*B01D 21/22* (2006.01)
*B01D 61/00* (2006.01)

(52) U.S. Cl. ............................. 210/195.2; 210/257.2; 210/134

(58) Field of Classification Search ................ 210/650, 210/195.2, 195.1, 651, 641, 652, 257.2, 134
See application file for complete search history.

(56) References Cited

U.S. PATENT DOCUMENTS

| | | |
|---|---|---|
| 3,295,988 A | 1/1967 | Malick et al. |
| 3,341,024 A | 9/1967 | Lowe et al. |
| 3,907,681 A | 9/1975 | Corrigan et al. |
| 3,929,639 A | 12/1975 | Turner et al. |

(Continued)

FOREIGN PATENT DOCUMENTS

| | | |
|---|---|---|
| EP | 0095850 | * 12/1983 |
| WO | WO 97/02087 | 1/1997 |

OTHER PUBLICATIONS

Otto Rhein, *Die Weinwirtschaft*, No. 5-7:134-138 (1975).

(Continued)

*Primary Examiner*—Ana Fortuna
(74) *Attorney, Agent, or Firm*—Leydig, Voit & Mayer, Ltd.

(57) ABSTRACT

A filtration system comprising a plurality of filters (14, 16, 18, 20). Each filter (14, 16, 18, 20) defines a respective filter flowpath extending adjacent a respective filtration medium (24) for tangential filtration by the filtration medium (24) of fluid passing through the filter flowpath. The system also comprises a manifold (32) connected to each filter (14, 16, 18, 20), the system being selectively operable in a first state in which the manifold (32) and the filter flowpaths form part of a first continuous flowpath (92, 36, 38, 40, 42, 44, 101, 56, 48, 50, 52, 54, 58, 88) around which fluid circulates passing in parallel through the filter flowpaths and a second state in which fluid circulates around a second continuous flowpath (94, 82, 86, 98, 101, 48, 58) including the filter flowpath of at least one (14) but not all of the filters, the second continuous flowpath having a lower volume than the first continuous flowpath and fluid passing into the second continuous flowpath from the manifold (32) responsive to tangential filtration in the second state.

7 Claims, 3 Drawing Sheets

U.S. PATENT DOCUMENTS

| | | | |
|---|---|---|---|
| 3,988,486 | A | 10/1976 | Rhein |
| 4,070,291 | A | 1/1978 | Rhein |
| 4,322,446 | A | 3/1982 | Heess et al. |
| 4,560,565 | A | 12/1985 | Wucherpfennig et al. |
| 4,610,887 | A | 9/1986 | Galzy et al. |
| 4,617,127 | A | 10/1986 | Light |
| 4,889,743 | A | 12/1989 | Tazawa et al. |
| 4,994,190 | A | 2/1991 | Uban |
| 5,112,489 | A * | 5/1992 | Hartmann |
| 5,693,229 | A | 12/1997 | Hartmann |
| 5,800,713 | A | 9/1998 | Hartmann |
| 6,019,902 | A * | 2/2000 | Hussey et al. |
| 6,495,046 | B1 * | 12/2002 | Hartmann |

OTHER PUBLICATIONS

Hsu, J. C. et al., *Am. J. Enol. Vitic.*, 38(1):17-22 (1987).

Ribeiro-Corréa, P. et al., *Proceedings for the 4$^{th}$ International Symposium on Cool Climate Vitculture and Enology*, VI-80-VI-83.

Goodwin, C. O. et al., *AJEV*, 42(4):347-353 (1991).

California Energy Commission, An Interim Report based on Membrane Trials Conducted at E&J Gallo Winnery, Fresno, California, 1-24 (2001).

Nguyen, M. H. et al., *The Australian Grapegrower & Winemaker*, 57-59 (1991).

Miller, G. C. et al., *The Australian Grapegrower & Winemaker*, 46-50 (1985).

Rektor, A. et al., *Desalination*, 162, 271-277 (2004).

R. Binnig, *Confructa Studien*, 123-133 (1989).

Mietton-Peuchot, M. et al., *Desalination*, 148, 125-129 (2002).

Bottino, A. et al., *Desalination*, 148, 73-77 (2002).

Kiss, I. et al., *Desalination*, 162, 295-300 (2004).

* cited by examiner

FILTRATION SYSTEMS AND METHODS

The invention relates to filtration systems and methods.

A known filtration system has a continuous flowpath for circulation of fluid around the flowpath. Fluid circulating around the flowpath is filtered so that fluid leaves the flowpath on filtration. The system includes a reservoir from which unfiltered fluid is passed to the continuous flowpath in response to the filtration of fluid circulating around the continuous flowpath. When the reservoir empties, circulation around the continuous flowpath ceases as fluid lost through filtration cannot be replaced.

A significant amount of unfiltered fluid may remain in the continuous flowpath when circulation ceases. It is often desirable to filter at least part of this remaining fluid so as to maximize the yield of filtered fluid.

According to a first aspect of the invention there is provided a filtration system comprising, a first continuous flowpath for circulation of fluid therearound, a second continuous flowpath for circulation of fluid therearound after said circulation around said first continuous flowpath, a portion of the first continuous flowpath not being included in the second continuous flowpath and the second continuous flowpath having a lower volume than the first continuous flowpath, wherein the first and second continuous flowpaths each include a filtrations means and fluid circulating around each continuous flowpath is filtered so that fluid leaves said each continuous flowpath on filtration; means for passing fluid to the first continuous flowpath in response to said filtration of fluid circulating around the first continuous flowpath; and means for passing fluid to the second continuous flowpath from the portion in response to said filtration circulating the second continuous flowpath.

According to a second aspect of the invention, there is provided a filtration system comprising a plurality of filters, each filter defining a respective filter flowpath extending adjacent a respective filtration medium for tangential filtration by the filtration medium of fluid passing through the filter flowpath, and a manifold connected to each filter, the system being selectively operable in a first state in which the manifold and the filter flowpaths form part of a first continuous flowpath around which fluid circulates passing in parallel through the filter flowpaths and a second state in which fluid circulates around a second continuous flowpath including the filter flowpath of at least one but not all of the filters, the second continuous flowpath having a lower volume than the first continuous flowpath and fluid passing into the second continuous flowpath from the manifold responsive to tangential filtration in the second state.

According to a third aspect of the invention, there is provided a filtration system comprising a plurality of filters, each filter defining a respective filter flowpath extending adjacent a respective filtration medium for tangential filtration by the filter medium of fluid passing through the filter flowpath, and a manifold connected to each filter for circulation of fluid through the manifold and through, in parallel, the filter flowpaths, the system being selectively operable to pass fluid from the manifold to at least one but not all of the filters.

According to a fourth aspect of the invention there is provided a filtration system comprising a plurality of filters, each filter defining a respective filter flowpath extending adjacent a respective filtration medium for tangential filtration by the filtration medium of fluid passing through the filter flowpath, and a manifold connected to each filter, the system being selectively operable in a first state in which the manifold and the filter flowpaths form part of a first continuous flowpath around which fluid circulates passing in parallel through the filter flowpaths and a second state in which fluid flows in a second flowpath including at least a portion of the filter flowpath of at least one of the filters, the second flowpath having a lower volume than the first continuous flowpath.

According to a fifth aspect of the invention there is provided a filtration method comprising the steps of, circulating fluid around a first continuous flowpath, fluid circulating around the first continuous flowpath being filtered so that fluid leaves the first continuous flowpath on filtration, passing fluid to the first continuous flowpath in response to said filtration of fluid circulating around the first continuous flowpath, circulating fluid around a second continuous flowpath having a lower volume than the first continuous flowpath, a portion of the first continuous flowpath not being included in the second continuous flowpath, fluid circulating around the second continuous flowpath being filtered so that fluid leaves the second continuous flowpath on filtration, passing fluid to the second continuous flowpath from the portion in response to said filtration of fluid circulating around the second continuous flowpath.

According to a sixth aspect of the invention there is provided a filtration method comprising the steps of providing a plurality of filters, each filter defining a respective filter flowpath extending adjacent a respective filtration medium for tangential filtration by the filtration medium of fluid passing through the filter flowpath, and a manifold connected to each filter, circulating fluid around a first continuous flowpath formed partly by the manifold and the filter flowpaths, the fluid passing in parallel through the filter flowpaths; and circulating fluid around a second continuous flowpath including the filter flowpath of at least one but not all of the filters; the second continuous flowpath having a lower volume than the first continuous flowpath and fluid passing into the second continuous flowpath from the manifold in response to tangential filtration by said at least one filter.

According to a seventh aspect of the invention there is provided a filtration method comprising the steps of; providing a plurality of filters, each filter defining a respective filter flowpath extending adjacent a respective filtration medium for tangential filtration by the filter medium of fluid passing through the filter flowpath, and a manifold connected to each filter; circulating fluid through the manifold and through, in parallel, the filter flowpaths; and passing fluid from the manifold to at least one but not all of the filters.

According to an eighth aspect of the invention there is provided a filtration method comprising the steps of; providing a plurality of filters, each filter defining a respective filter flowpath extending adjacent a respective filtration medium for tangential filtration by the filtration medium of fluid passing through the filter flowpath, and a manifold connected to each filter, circulating fluid around a first continuous flowpath formed partly by the manifold and the filter flowpaths; the fluid passing in parallel through the filter flowpaths; flowing fluid in a second flowpath including at least a portion of the filter flowpath of at least one of the filters; the second flowpath having a lower volume than the first continuous flowpath.

The following is a more detailed description, by way of example, of embodiments of the invention, reference being made the appended drawings, in which.

Figure 1:
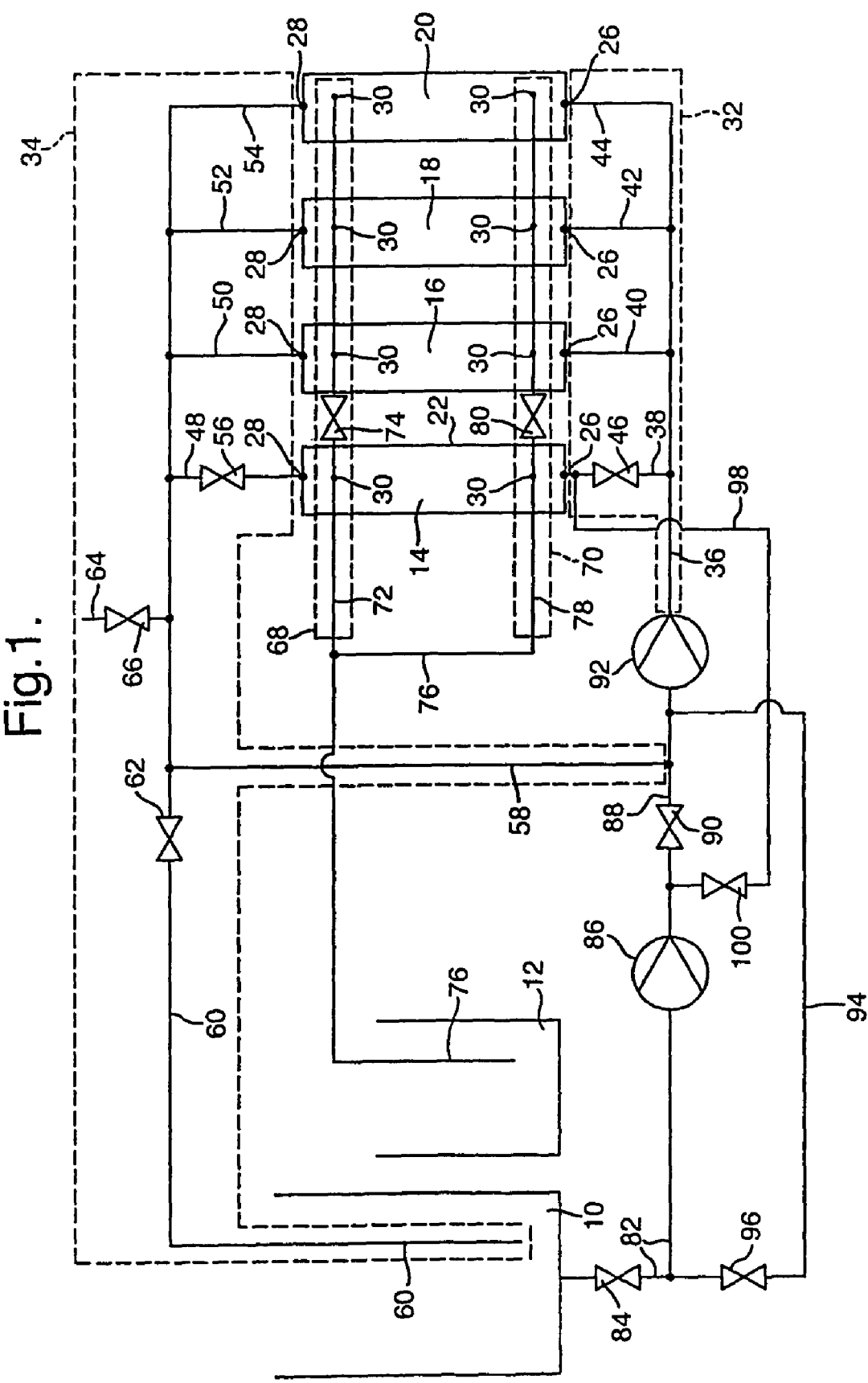
FIG. 1 is a schematic representation of a first filtration system.

As shown in FIG. 1, the first filtration system includes a tank 10 for unfiltered liquid, a tank 12 for filtered liquid and four filters 14,16,18,20.

Figure 2:
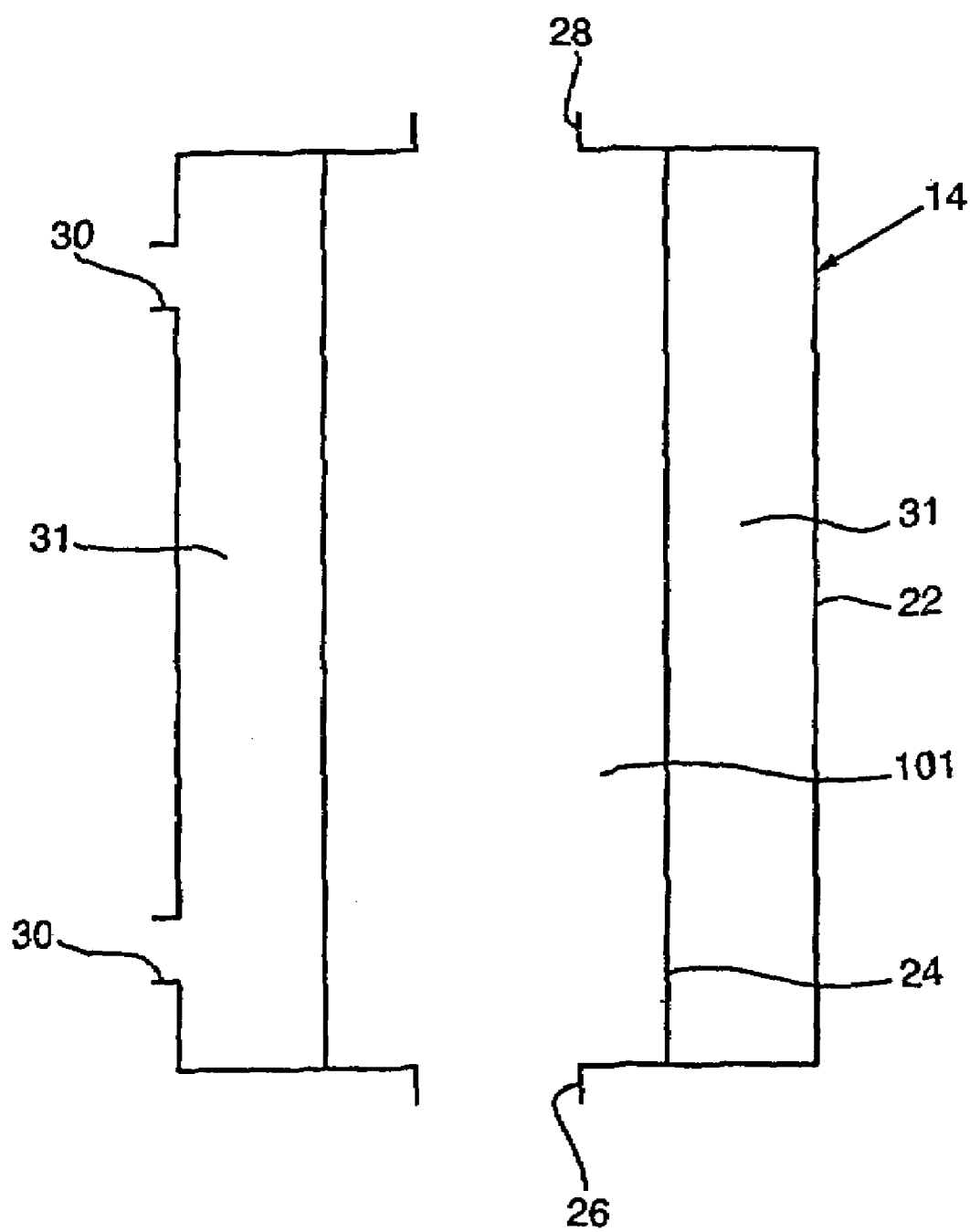
FIG. 2 is a schematic representation of a filter of the first filtration system of FIG. 1.

The filters 14,16,18,20 are identical and only one filter 14 will be described in detail. As shown in FIGS. 1 and 2, the filter 14 has an outer cylindrical casing 22 that contains a cylindrical filter medium 24. Each end of the cylindrical filter medium 24 is sealed to a respective end of the cylindrical casing 22.

A liquid inlet 26 is provided in one end of the cylindrical casing 22 and communicates with the interior of the filter medium 24. A liquid outlet 28 is provided in the other end of the cylindrical casing 22 and also communicates with the interior of the filter medium 24. Two further liquid outlets 30 (an upper and a lower outlet) are provided in the circumferential surface of the cylindrical casing 22 and communicate with an annular space 31 within the casing 22 that lies radially outwardly of the filter medium 24.

The reference numbers given to the features of filter 14 will be used for the corresponding features of the filters 16,18,20.

The filters 14,16,18,20 are connected between first and second manifolds 32,34, shown schematically by dotted outlines. As shown in FIG. 1, the first manifold 32 lies below the filters 14,16,18,10 and the second manifold 34 lies above the filters 14,16,18,20. The first manifold 32 has a single inlet 36 and four outlets 38,40,42,44. One of the outlets 38 is provided with a valve 46 that is switchable between open and closed positions.

The outlet 38 provided with the valve 46 is connected to the liquid inlet 26 of filter 14. The remainder of the outlets 40,42,44 of the first manifold 32 are connected to respective ones of the liquid inlets 26 of the filters 16,18,20.

The second manifold 34 has four inlets 48,50,52,54. The inlet 48 is provided with a valve 56. The valve 56 is a butterfly valve that has been adapted by drilling holes of predetermined diameter in the valve blade. The arrangement is such that when the valve blade is open liquid can flow through the valve 56 readily and when the valve blade is closed, there is a restricted flow of liquid through the holes drilled in the valve blade.

The inlet 48 of the second manifold 34 that is provided with the valve 56 is connected to the liquid outlet 28 of the filter 14. The remaining inlets 50,52,54 of the second manifold 34 are connected to respective fluid outlets 28 of the remaining filters 16,18,20.

The second manifold 34 has a first outlet 58 for passing fluid back to the first manifold 32, as described below, and a second outlet 60 for passing liquid to the unfiltered liquid tank 10. The second outlet 60 is provided with a valve 62 which is switchable between open and closed positions.

The second manifold 34 is also provided with a vent 64 leading to the atmosphere and provided with a valve 66 which is switchable between an open and a closed position.

The system also comprises a third manifold 68 and a fourth manifold 70 which are shown schematically in FIG. 1 in dotted outline. The third manifold 68 has first, second, third and fourth inlets (not shown) and a single outlet 72. The third manifold 68 also has a valve 74 switchable between an open position in which all the inlets are connected to the outlet 72 and a closed position, in which the first inlet remains connected to the outlet 72 and the second, third and fourth inlets are isolated from the outlet 72.

The first inlet of the third manifold 68 is connected to the upper one of the liquid outlets 30 in the cylindrical casing 22 of the filter 14. Each of the second, third and fourth inlets of the third manifold is connected to a respective one of the upper liquid outlets 30 in the filters 16,18,20. The outlet 72 of the third manifold 68 is connected to a line 76 leading to the filtered liquid tank 12.

The fourth manifold 70 is similar to the third manifold 68 having first, second, third and fourth inlets (not shown) and a single outlet 78. A valve 80 is provided in the fourth manifold 70 and, as per the valve 74, serves to connect or isolate the second, third and fourth inlets of the fourth manifold 70 to/from the fourth manifold outlet 78. The first inlet of the fourth manifold 70 remains connected to the outlet 78 independently of the operation of the valve 80.

The first inlet of the fourth manifold 70 is connected to the lower one of the liquid outlets 30 of the filter 14. Each of the second, third and fourth inlets of the fourth manifold 70 is connected to a respective one of the lower liquid outlets 30 of the filters 16,18,20. The fourth manifold outlet 78 is connected to the line 76.

A first feedline 82 provided with a valve 84 connects the unfiltered liquid tank 10 to the inlet of a first pump 86. A second feedline 88 provided with a valve 90 connects the outlet of the first pump 86 to the inlet of a second pump 92. The outlet of the second pump 92 is connected to the inlet 36 of the first manifold 32.

Each of the valves 84,90 is switchable between open and closed positions.

Typically, the first and second pumps 86,92 are such that the second pump 92 pumps liquid with a throughput approximately ten times greater than that of the first pump 86. The volume of the liquid held within the second pump 92 is greater than that held within the first pump 86.

The system also comprises a first bypass 94 that extends from the second feedline 88, from a point between the valve 90 and the second pump 92, to the first feedline 82, to a point between the valve 84 and the first pump 86. The first bypass 94 is provided with a valve 96 that is switchable between open and closed positions.

A second bypass 98 extends from the second feedline 88, from a point between the first pump 86 and the valve 90 to the outlet 38 of the first manifold 32, at a point between the valve 46 and the fluid inlet 26 of the filter 14.

The second bypass 98 has a valve 100 that is switchable between open and closed positions.

The bypasses 94,98 are formed of small bore pipe.

In operation, the filtration system is used to filter wine to remove sediment from the wine. The system operates in two stages, as described below.

In the first stage, the valves 96,100 in the first and second bypasses 94,98 and the valve 66 in the vent 64 are closed. The remaining valves 84,90,46,56,74,80 and 62 are open.

Wine to be filtered is placed in the unfiltered liquid tank 10 and passes from the tank 10 to the first pump 86 via the first feedline 82. The first pump 86 pumps the wine along the second feedline 88 to the second pump 92. The second pump 92 pumps wine into the first manifold 32 via the manifold inlet 36.

Wine passes through each of the outlets 38,40,42,44 of the first manifold 32 into the corresponding fluid inlets 26 of the filters 14,16,18,20. With reference to FIG. 2, wine then passes, in each filter 14,16,18,20, through the interior of the cylindrical filter medium 24 to the fluid outlet 28 of the filter 14,16,18,20.

Hence, in each filter, 14,16,18,20, the interior 101 of the cylindrical filter medium 24 acts as a flowpath by which unfiltered wine passes through the filter 14,16,18,20. In each filter 14,16,18,20 a portion of the unfiltered wine entering the filter at the fluid inlet 26 passes from this flowpath across the filter medium 24 to the annular space 31 outside the filter medium. Wine that has passed across the filter medium 24 is relatively free of sediment, the sediment largely remaining in the flowpath formed by the interior 101 of the filter medium 24.

Filtration in this manner (the fluid to be filtered being passed over a filtration medium so that a portion of the fluid passes across the medium so as to be filtered and the remainder of the fluid passes along the filter medium to an outlet) is well known and referred to as tangential filtration. Tangential filtration includes tangential filtration in filters which have no moving parts and filters which do have moving parts, i.e. dynamic filters.

Unfiltered wine (and sediment removed from the filtered wine) passes out of the filters 14,16,18,20 via the fluid outlets 28 into the inlets 48,50,52,54 of the second manifold 34. The majority of the wine passing into the second manifold 34 passes via the first outlet 58 of the second manifold 32 to the second feedline 88 and so back to the inlet of the second pump 92.

A small portion of the wine from the second manifold 34 passes via the second outlet 60 to the unfiltered liquid tank 10 for a purpose described below.

It will be appreciated that the second pump 92, the first manifold 32, the interior of the filter media 24, the second manifold 34 (including the inlets 48,50,52,54, the first outlet 58 but excluding the second outlet 60) and a small portion of the second feedline 88 (between the first outlet 58 and the second pump 92) form a first continuous flowpath for unfiltered wine. Once the components of this continuous flowpath have been primed with wine, the second pump 92 serves largely to circulate the wine around this flowpath. During this circulation, wine continuously passes across the filter media 24, so as to be filtered, and collects in the annular spaces 31 of the filters 14,16,18,20. Wine passes from the annular spaces, through the upper and lower liquid outlets 30 into the inlets of the third and fourth manifolds 68,70 and from the outlets 72,78 of the third and fourth manifold 68,70 to the filtered liquid tank 12 via the line 76.

Clearly, as wine is filtered by the filters 14,16,18,20, wine is lost from the first continuous flowpath referred to above. Additionally, wine is lost from this flowpath via the outlet 60 of the second manifold 34. Wine lost from the first continuous flowpath is replaced by wine from the unfiltered liquid tank 10 which passes into the first continuous flowpath via the first feedline 82, the first pump 86 and the second feedline 88, in response to the loss due to the filtration and the loss via the outlet 60.

The first pump 86 also serves to maintain a constant, predetermined pressure at the inlet of the second pump 92. Wine leaving the second pump 92 is at a greater pressure (generally 2.0-2.5 bar), suitable for efficient functioning of the filters 14,16,18,20.

As the sediment from the filtered wine is largely retained in the continuous flowpath, the concentration of the sediment in the continuous flowpath increases. The increase in concentration can be detrimental to efficient filtration. The passage of a portion of the wine from the continuous flowpath back to the unfiltered liquid tank 10 via the second outlet 60 of the second manifold 34 helps to slow the rate of increase of concentration of this sediment in the continuous flowpath. The volume of wine leaving the continuous flowpath via the second outlet 60 is generally two to four times the volume of wine that leaves the flowpath as filtered wine.

As mentioned above, the volume of unfiltered wine passed to the continuous flowpath from the unfiltered liquid tank 10 corresponds to the sum of the volume of the filtered wine and the volume of unfiltered wine leaving the continuous flowpath via the second outlet 60 and thus the bleeding of unfiltered wine from the continuous flowpath via the second outlet 60 results in the passage of a greater volume of wine (having a relatively low sediment concentration) from the unfiltered liquid tank 10 to the continuous flowpath.

During the first stage of operation, as described above, wine does not flow through the first and second bypasses 94,98 as these bypasses are closed by the valves 96,100.

Circulation of unfiltered wine around the continuous flowpath continues until the unfiltered liquid tank 10 is empty. At this stage, as it is no longer possible to replenish the wine in the continuous flowpath, flow around the flowpath ceases. However, a significant volume of unfiltered wine remains in the first and second manifolds 32,34, in the second pump 92 and in the interiors of the filter media 24. It is clearly desirable to filter as much of this remaining wine as possible, so as to maximize the yield of filtered wine.

In order to filter at least part of the remaining wine the system is operated in a second stage. It will be appreciated that by using suitable sensors and automatic controls for opening and closing the valves, the second stage operation can be performed immediately after circulation around the continuous flowpath ceases.

In the second stage, the valves 96,100 in the first and second bypasses 94,98 are opened. Additionally, the valve 66 in the vent 64 is opened. The remaining valves, 84,90, 46,56,74,80 and 62 are closed. The second pump 92 is turned off and the first pump 96 remains functioning.

Making reference to FIG. 1, unfiltered wine from the second pump 92 and from the portion of the second feedline 88 between the valve 90 and the second pump 92 passes through the first bypass 94 to the inlet of the first pump 86 and is pumped via the first pump 86 through the second bypass 98. The wine then passes into the filter 14 through the fluid inlet 26 and through the flowpath formed by the interior 101 of the filter medium 24 of the filter 14 to the filter outlet 28 of this filter 14. Unfiltered wine then passes through the valve 56.

As described above, the valve 56 is closed but is provided with holes through the valve blade. The holes allow a restricted flow of the wine through the valve 56. The restriction in flow of wine through the valve 56 acts to increase the pressure within the interior 101 of the filter medium 24 of the filter 14, thereby aiding filtration through the filter medium 24.

The majority of wine passing through the valve 56 will then flow through the first outlet 58 of the second manifold 34 back to the first bypass 94. A small portion of the wine passing through the valve 56 may pass into the filters 16,18,20.

During this process, unfiltered wine in the inlets 50,52,54 of the second manifold 34, in the interiors 101 of the filter media 24 of the filters 16,18,20 and in the first manifold 32 passes into and through the second pump 92 (under gravity) so as to be pumped through the filter 14 via the first and second bypasses 94,98, as described above. The vent 64 admits air to facilitate this.

It will be appreciated that the first bypass 94, part of the first feedline 82 (leading between the first bypass 94 and the first pump 86), the first pump 86, a portion of the second feedline 88 (leading between the first pump 86 and the second bypass 98), the second bypass 98, the interior 101 of the filter medium 24 of the filter 14, the inlet 48 of the second manifold 34, the first outlet 58 of the second manifold 34 and another portion of the second feedline 88 (from the outlet 58 to the first bypass 94) form a second continuous flowpath. After the components of the second continuous flowpath have been primed (if necessary), the first pump 86 circulates unfiltered wine around this second continuous flowpath. As wine is lost from this second continuous flowpath, either by filtration across the filter medium 24 of the filter 14 or by passage into the filters 16,18,20, this wine is replaced by wine in the second pump 92, in the first manifold 32 and in the interiors of the filter media 24 of the filters 16,18,20. Thus, in the second stage of operation, the first manifold 32, the second pump 92 and the interiors of the filter media 24 of the filters 16,18,20 (which are included in the first but not in the second continuous flowpath) act in the same way, as a reservoir, as the unfiltered liquid tank 10 acts in the first stage of operation. In other words, wine passes from the first manifold 32, the second pump 92 and the interiors of the filter media 24 of the filters 16,18,20 to the second continuous flowpath in response to loss (including loss by filtration) of wine from the second continuous flowpath.

The volume of this second continuous flowpath, as described above, is considerably less than the volume of the continuous flowpath (described above) of the first stage. This is because the first and second bypasses 94,98 are formed by narrow bore pipes and because the second continuous flowpath does not include the first manifold 32, the interiors of the filter media 24 of the filters 16,18,20, or the second pump 92. Each of these excluded components has a relatively large volume.

Circulation around the second continuous flowpath will continue until the second pump 92, the first manifold 32 and the interiors of the filter media 24 of the filters 16,18,20 have been emptied of wine. (The relative heights of the components of the filtration system are chosen to allow complete emptying of the interiors 101 of the filters 16,18,20, of the first manifold 32 and of the second pump 92.) Circulation of wine around the second continuous flowpath will stop shortly thereafter.

There will, of course, be a volume of wine remaining in the second continuous flowpath after circulation has ceased. However, as the volume of the second continuous flowpath is considerably less than that of the continuous flowpath of the first stage, the volume of remaining unfiltered wine after the second stage will be considerably less than the volume of unfiltered wine remaining after the first stage. For example, the volume of wine remaining after the first stage may be approximately 470-500 liters, whereas the volume of wine remaining after the second stage may be approximately 50 liters or less.

Wine filtered by the filter 14 during the second stage collects in the annular space 31 of the filter 14, passes through the upper and lower liquid outlets 30 into the third and fourth manifolds 68,70 and passes from the manifolds 68,70 into the line 76 to the filtered fluid tank 12. As the valves 74,80 are closed, the parts of the second and third manifold 68,70 serving the filters 16,18,20 are isolated from the first inlets of the third and fourth manifolds 68,70 and from the outlets 72,78 of the third and fourth manifolds 68,70.

The system has a number of advantages.

Firstly, the unfiltered wine remaining in the continuous flowpath after the first stage is partly filtered during the second stage without the need for a separate filtration system.

Secondly, the time and extra handling involved in transferring unfiltered wine to a separate filtration system are avoided.

Thirdly, the manifolds can have large cross-sectional areas, as they are not included in the second continuous flowpath. This decreases friction and heat generation during circulation in the first stage.

Figure 3:
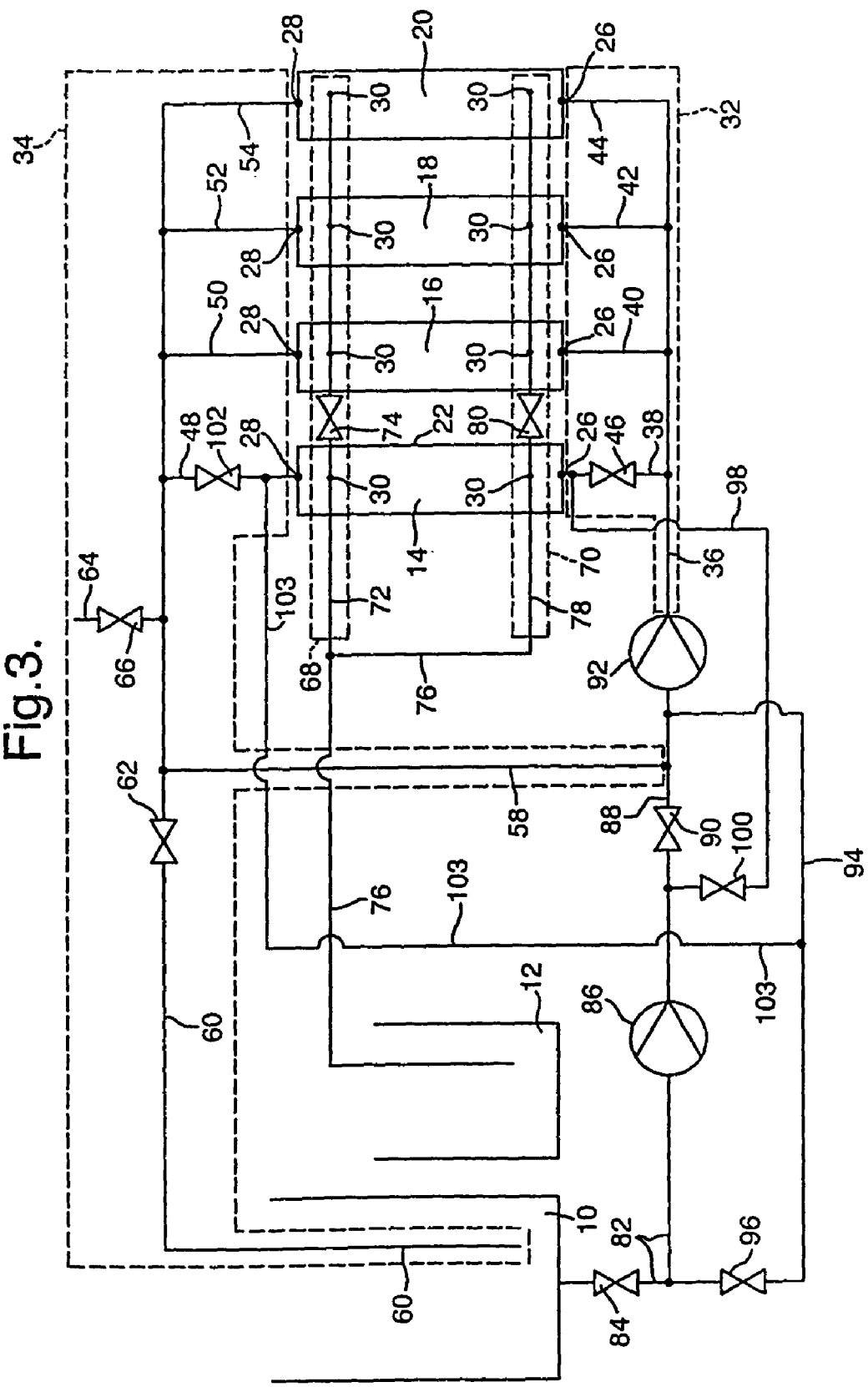
FIG. 3 is a schematic representation of a second filtration system.

A second filtration system is shown in FIG. 3. Features of the second filtration system that are common to the first filtration system described above and the second filtration system are not described in detail below and will be given the same reference numerals as the corresponding features of the first filtration system.

The second filtration system is structurally identical to the first filtration system with two exceptions.

The first exception is that, in place of the valve 56 of the first filtration system, the second filtration system has a butterfly valve 102 that has a single hole drilled through its valve blade. The arrangement is such that when the butterfly valve 102 is open, liquid can flow through the valve 102 readily (as for the valve 56 of the first system). When the butterfly valve 102 is closed, the single hole in the valve blade allows a flow of liquid through the valve 102 that corresponds to about 10% of the liquid flow permitted by the several holes of the valve 56 of the first filtration system when the valve 56 is closed.

The second exception is that a third bypass 103 is connected between the first bypass 94 and the portion of the inlet 48 between the filter 14 and the butterfly valve 102. The connection between the third bypass 103 and the first bypass 94 is permanently open. The connection between the third bypass 103 and the inlet 48 is closed when the butterfly valve 102 is open and open when the butterfly valve 102 is closed. The third bypass 103 is as short as possible and has a smaller bore than the first outlet 58 of the second manifold 34.

In operation, as for the first filtration system, the second filtration system is used to filter wine to remove sediment from the wine. The second filtration system also operates in two stages. The first operational stage of the second filtration system is similar to the first operational stage of the first filtration system—the butterfly valve 102 being open (corresponding to the valve 56 of the first filtration system being open during the first operational stage of the first filtration system). As the butterfly valve 102 is open, the connection between the inlet 48 and the third bypass 103 is closed and no flow through the third bypass 103 occurs.

Hence, during the first operational stage of the second filtration system, the second pump 92, the first manifold 32, the interior of the filter media 24, the second manifold 34 (including the inlets 48,50,52,54, the first outlet 58 but excluding the second outlet 60) and a small portion of the second feedline 88 (between the first outlet 58 and the second pump 92) form a first continuous flowpath for unfiltered wine. As wine is lost from this continuous flowpath by filtration and via the outlet 60 of the second manifold, it is replaced by wine from the unfiltered liquid tank 10 (as for the first operational stage of the first filtration system). The first operational stage ends once the unfiltered liquid tank 10 has emptied.

The second operational stage then starts.

In the second stage, the valves 96,100 in the first and second bypasses 94,98 are opened. Additionally, the valve 66 in the vent 64 is opened. The butterfly valve 102 and the remaining valves, 84,90,46,74,80 and 62 are closed. The second pump 92 is turned off and the first pump 96 remains functioning.

Making reference to FIG. 3, unfiltered wine from the second pump 92 and from the portion of the second feedline 88 between the valve 90 and the second pump 92 (the second pump 92 and the portion in turn being fed with wine from the first manifold 32 and the first outlet 58 of the second manifold 34) passes through the first bypass 94 to the inlet of the first pump 86 and is pumped via the first pump 86 through the second bypass 98. During this process wine does not enter, or enters only to a small extent, the third bypass 103. The wine then passes into the filter 14, through the fluid inlet 26, and through the flowpath formed by the interior 101 of the filter medium 24 of the filter 14 to the filter outlet 28 of this filter 14. Unfiltered wine then passes from the filter 14 to the third bypass 103 and to the butterfly valve 102.

As described above, the butterfly 102 is closed but is provided with a single hole through the valve blade. The hole allows about 10% of the unfiltered wine passing from the filter 14 to pass through the valve 102 so as to enter the first outlet 58 of the second manifold 34 and the filters 16,18,20 via the inlets 50,52,54 of the second manifold 34. The remainder of the unfiltered wine passing from the filter 14 (about 90%) passes through the third bypass 103 back to the first bypass 94.

It will be appreciated that part of the first bypass 94, (extending between the third bypass 103 and the first feedline 82), part of the first feedline 82 (leading between the first bypass 94 and the first pump 86), the first pump 86, a portion of the second feedline 88 (leading between the first pump 86 and the second bypass 98), the second bypass 98, the interior 101 of the filter medium 24 of the filter 14, part of the inlet 48 of the second manifold 34, (leading between the filter 14 and the third bypass 103), and the third bypass 103 form a second continuous flowpath. After the components of the second continuous flowpath have been primed (to the extent that this is necessary), the first pump 86 circulates unfiltered wine around the second continuous flowpath. As wine is lost from the second continuous flowpath (either by filtration across the filter medium 24 of the filter 14 or by passage through the hole in the valve blade of the valve 102 into the filters 16,18,20 or into the first outlet 58), this wine is replaced by wine in the second pump 92, in the first manifold 32, in the interiors of the filter media 24 of the filters 16,18,20 and in the first outlet 58 of the second manifold 34. Thus, in the second stage of operation, the first manifold 32, the second pump 92, the interiors of the filter media 24 of the filters 16,18,20 and the first outlet 58 of the second manifold 34 act in the same way (as a reservoir) as the unfiltered liquid tank 10 acts in the first stage of operation.

The volume of the second continuous flowpath (as described above) of the second filtration system is considerably less than the volume of the second continuous flowpath (described above) of the second operational stage of the first filtration system. This is because the third bypass 103 has a narrower bore than the first outlet 58 of the second manifold 34 (which forms part of the second continuous flowpath of the first filtration system and which is replaced in the second continuous flowpath of the second filtration system by the third bypass 103).

Circulation around the second continuous flowpath will continue until the second pump 92, the first manifold 32, the interiors of the filter media 24 of the filters 16,18,20 and the first outlet 58 of the second manifold 34 have been emptied of wine. (The relative heights of the components of the filtration system are chosen to allow complete emptying of these components.) Circulation of wine around the second continuous flowpath will stop shortly thereafter.

There will, of course, be a volume of wine remaining in the second continuous flowpath after circulation has ceased. This may be as low as 10 liters in total. Hence, the use of the third bypass 103 allows the amount of residual wine to be reduced even further.

Wine filtered by the filter 14 during the second stage passes to the filtered fluid tank 12 as for the second operational stage of the first filtration system.

The first and second filtration systems need not be used to filter wine, any suitable liquid may be filtered. The systems may also be adapted to filter gases.

It will be appreciated that the first and second filtration systems may be adapted in many different ways. For example, the systems may use any plural number of filters. Where more than two filters are used, fluid is preferably passed through two or more, but not all, of the filters during the second stage.

Whereas, in the systems described above, liquid circulates from a lower manifold up through the filters 14,16,18,20 to an upper manifold in the first stages and upwardly through the filter 14 in the second stages, this need not be the case. In either the first and/or the second stage of either the first or second filtration system liquid (or gas) may pass downwardly through the filters.

The filters 14,16,18,20 described above are tangential filters with no moving components. However, dynamic filters utilizing tangential flow may also be used. Such dynamic filters may include a cylindrical filter medium arranged concentrically with a non-filtering cylinder such that the filter medium lies closely adjacent to the non-filtering cylinder. The filter medium and the non-filtering cylinder rotate relative to one another and fluid flows between the filtration medium and the non-filtering cylinder. Filtration is tangential across the filter medium. Other dynamic filters which may utilize tangential flow include those disclosed in International Publications Nos. WO95/00231, WO97/02087, WO97/13571.

Alternatively, the system may use a single filter housing a filter medium. As fluid is circulated around the first continuous flowpath, the fluid passes through the filter and contacts the whole area of the filter medium. As fluid is circulated around the second continuous flowpath it may pass through the filter in the same way as for the first continuous flowpath or it may pass through part of the filter so as to contact only a part of the filter medium.

Alternatively, the first and second continuous flowpaths may be associated with separate filtration means and have no common filtration means. In this case the first and second continuous flowpaths need not have any common part.

Filtration of fluid circulating around either continuous flowpaths need not be tangential filtration. Any type of filtration in which fluid circulating around a flowpath leaves the flowpath on filtration may be used.

The invention claimed is:

1. A filtration system comprising:
a plurality of filters, each filter having an unfiltered fluid inlet, an unfiltered fluid outlet, a filtered fluid outlet, and a filtration medium and defining a filter flowpath between the unfiltered fluid inlet and the unfiltered fluid outlet for tangential filtration by the filtration medium of fluid passing through the filter flowpath, wherein the plurality of filters includes a first group of at least one but not all of the plurality of filters and a second group including the filters not in the first group;
a first manifold connected to the unfiltered fluid inlet of each of the plurality of filters;

a second manifold connected to the unfiltered fluid outlet of each of the plurality of filters;

a first continuous flowpath comprising:
  the filter flowpaths of the plurality of filters,
  the first and second manifolds,
  a first pump, and
  a fluid circuit coupled between the first pump and the first manifold and further coupled between the second manifold and the first pump, wherein the first pump is arranged with the fluid circuit to circulate fluid around the first continuous flowpath in parallel through the filter flowpaths of the plurality of filters, a portion of the fluid passing from the unfiltered fluid inlet along one side of the filter medium to the unfiltered fluid outlet of each of the filters and a portion of the fluid passing from the unfiltered fluid inlet through the filter medium of each filter and leaving each filter via the filtered fluid outlet;

a second continuous flowpath comprising:
  the filter flowpath of each filter in the first group,
  a second pump, and
  a fluid circuit coupled between the second pump and the unfiltered fluid inlet of each filter of the first filter group and further coupled between the unfiltered fluid outlet of each filter of the first filter group and the second pump, wherein the second pump is arranged with the fluid circuit to circulate fluid around the second continuous flowpath through each filter flowpath of the first filter group, a portion of the fluid passing from the unfiltered fluid inlet along one side of the filter medium to the unfiltered fluid outlet of each filter of the first filter group, and a portion of the fluid passing from the unfiltered fluid inlet through the filter medium of each filter of the first filter group and leaving each filter via the filtered fluid outlet, wherein the second continuous flowpath has a lower volume than the first continuous flow path; and a valve arrangement coupled to the first and second continuous flowpaths and selectively operable in a first state to circulate fluid around the first continuous flowpath and in a second state to circulate fluid around the second continuous flowpath and including a bypass to pass fluid from the first and second manifolds and the second filter group into the second continuous flow path in response to fluid flow around the second continuous flow path.

2. The filtration system of claim 1, wherein the plurality of filters is arranged in parallel between the first and second manifolds.

3. The filtration system of claim 1, wherein the first filter group has only one filter, 4. The filtration system of claim 1 wherein the valve arrangement includes a first valve operatively associated with the unfiltered fluid inlet of the first filter group and a second valve operatively associated with the unfiltered fluid outlet of the first filter group.

5. The filtration system of claim 1 wherein in the second state the first pump is coupled to the second continuous flowpath to drain unfiltered fluid from the first pump to the second continuous flow path.

6. A filtration system according to claim 1, wherein the first manifold is located below the filters for drainage of fluid from the or each filter flowpath not included in the second continuous flowpath into the first manifold during circulation of fluid around the second continuous flowpath.

7. A filtration system according to claim 1, including means for selectively restricting flow from the or each filter flowpath of said at least one filter.

* * * * *